United States Patent
Hoguchi (10) Patent No.: US 7,304,227 B2
(45) Date of Patent: Dec. 4, 2007

(54) METHOD AND SYSTEM FOR SYNTHESIZING ELECTRONIC TRANSPARENT AUDIO

(75) Inventor: Yusuke Hoguchi, Tokyo (JP)

(73) Assignee: Music Gate, Inc., Honolulu, HI (US)

( * ) Notice: Subject to any disclaimer, the term of this patent is extended or adjusted under 35 U.S.C. 154(b) by 336 days.

(21) Appl. No.: 10/934,752

(22) Filed: Sep. 3, 2004

(65) Prior Publication Data

US 2006/0048633 A1 Mar. 9, 2006

(30) Foreign Application Priority Data

Sep. 11, 2003 (JP) ............................ 2003-319879

(51) Int. Cl.
G10H 1/00 (2006.01)
G06F 12/14 (2006.01)
H04L 9/00 (2006.01)

(52) U.S. Cl. ............................ 84/600; 705/51; 705/55; 705/71; 705/75; 713/189

(58) Field of Classification Search .......... 84/600–602; 705/51, 55–58, 71, 75; 713/189
See application file for complete search history.

(56) References Cited

U.S. PATENT DOCUMENTS

| 6,845,170 B2 * | 1/2005 | Wendt ........................ 382/100 |
| 2003/0079131 A1 * | 4/2003 | Reefman ..................... 713/176 |
| 2003/0219036 A1 * | 11/2003 | Iliev et al. .................. 370/480 |
| 2003/0236872 A1 * | 12/2003 | Atkinson ..................... 709/223 |
| 2004/0128512 A1 * | 7/2004 | Sharma et al. .............. 713/176 |
| 2004/0136565 A1 * | 7/2004 | Hannigan et al. .......... 382/100 |
| 2004/0177091 A1 * | 9/2004 | Akiyoshi et al. ......... 707/104.1 |
| 2004/0260559 A1 * | 12/2004 | Kentish et al. ............. 704/273 |
| 2005/0033579 A1 * | 2/2005 | Bocko et al. ............... 704/273 |
| 2006/0143018 A1 * | 6/2006 | Densham et al. ........... 704/500 |
| 2007/0143617 A1 * | 6/2007 | Farber et al. ............... 713/176 |

FOREIGN PATENT DOCUMENTS

JP 2000-160233 5/2000

* cited by examiner

*Primary Examiner*—Lincoln Donovan
*Assistant Examiner*—David S. Warren
(74) *Attorney, Agent, or Firm*—Knobbe Martens Olson & Bear LLP (57) ABSTRACT

A method and system for synthesizing electronic watermarks is disclosed. The method includes generating electronic watermark sounds for music data by converting harmonic overtones that match the music data into signals. The generated electronic watermark sounds are then synthesized into the music data. The synthesized electronic watermark sounds and the music data are then output via various ways. In one embodiment, an encoded music file is generated, which can be sent to a recipient via a network or recorded on any of various recording media for distribution.

25 Claims, 5 Drawing Sheets

| 1st | 64Hz | 2nd | 128Hz | 4th | 256Hz | 8th | 512Hz | 16th | 1024Hz |
|---|---|---|---|---|---|---|---|---|---|
| 2nd | 128Hz | 4th | 256Hz | 8th | 512Hz | 16th | 1024Hz | 32th | 2048Hz |
| 3rd | 192Hz | 6th | 384Hz | 12th | 768Hz | 24th | 1536Hz | 48th | 3072Hz |
| 4th | 256Hz | 8th | 512Hz | 16th | 1024Hz | 32th | 2048Hz | 64th | 4096Hz |
| 5th | 320Hz | 10th | 640Hz | 20th | 1280Hz | 40th | 2560Hz | 80th | 5120Hz |
| 6th | 384Hz | 12th | 768Hz | 24th | 1536Hz | 48th | 3072Hz | 96th | 6114Hz |
| 7th | 448Hz | 14th | 896Hz | 28th | 1792Hz | 56th | 3584Hz | 112th | 7168Hz |
| 8th | 512Hz | 16th | 1024Hz | 32th | 2048Hz | 64th | 4096Hz | 128th | 8192Hz |
| 9th | 576Hz | 18th | 1152Hz | 36th | 2304Hz | 72th | 4608Hz | 144th | 9216Hz |
| 10th | 640Hz | 20th | 1280Hz | 40th | 2560Hz | 80th | 5120Hz | 160th | 10240Hz |
| 11th | 704Hz | 22th | 1404Hz | 44th | 2816Hz | 88th | 5632Hz | 176th | 11264Hz |
| 12th | 768Hz | 24th | 1536Hz | 48th | 3072Hz | 96th | 6114Hz | 192th | 12288Hz |
| 13th | 832Hz | 26th | 1664Hz | 52th | 3328Hz | 104th | 6656Hz | 208th | 13312Hz |
| 14th | 896Hz | 28th | 1792Hz | 56th | 3584Hz | 112th | 7168Hz | 224th | 14336Hz |
| 15th | 960Hz | 30th | 1920Hz | 60th | 3840Hz | 120th | 7680Hz | 240th | 15360Hz |
| 16th | 1024Hz | 32th | 2048Hz | 64th | 4096Hz | 128th | 8192Hz | 256th | 16384Hz |

METHOD AND SYSTEM FOR SYNTHESIZING ELECTRONIC TRANSPARENT AUDIO

BACKGROUND OF THE INVENTION

1. Field of the Invention

The field of the invention relates to a computerized method and system for synthesizing electronically transparent audio. More particularly, embodiments of the present invention relate to a method of synthesizing electronic watermarks that contain information on copyright identification to be appended to music data, as well as a system for synthesizing such electronic watermarks.

2. Description of the Related Art

Various multimedia devices using digital data have become widely popular in recent years. Regarding music data, an environment is now in place where the user can easily copy music in a desired format, for example by copying a CD (compact disc) to an MD (mini disc) or using a personal computer to download to a dedicated handheld player any MP3 (MPEG Audio Layer 3) music data distributed over the Internet.

With the increase in the utility of music through its digitization in a readily recordable manner, and given the increasingly diverse applications of music, a growing number of music creators are playing or copying parts of recorded music, and it has become sufficiently possible for anyone to rearrange and recompile copied parts into a new track and claim it as an original work.

Needless to say, music data are copyrighted works, and therefore essentially those who copy or broadcast music data must pay royalties to the copyright owners. However, in today's environment, where music can easily be copied as digital data, it is extremely difficult to prevent violation of copyrights and neighboring rights or reliably identify those who violate such rights.

Technologies are therefore being studied as a means of embedding, into individual music data using electronic watermark technology, a set of copyright information specifying the distribution route or history of each music data, in order to protect the rights of copyright owners and collect royalties on uses of music data in a reliable manner.

Applicant has proposed a technology to generate electronic watermarks using harmonics, pedal tones and other consonances conforming to music theory, and to record the watermarks in the original music data by synthesizing them into the data. This technology is described in Applicant's Japanese Publication 2001-343974 of Patent Application No. JP2000-160233, which is hereby incorporated by reference.

SUMMARY OF CERTAIN INVENTIVE ASPECTS

In one embodiment of the invention, there is a method of synthesizing electronic watermarks, the method comprising generating electronic watermark sounds for original music data comprising converting harmonic overtones that match the original music data into signals, synthesizing the generated electronic watermark sounds into the original music data, and outputting watermarked music data comprising the synthesized electronic watermark sounds and the original music data, wherein the electronic watermark sounds do not contain consonances matching the tonality of the original music data.

The electronic watermark sounds in the method may contain signals representing the copyright information of the original music data. The original music data may comprise multiple sets of music data, including voice and/or instrumental sound. The generating may comprise generating separate electronic watermark sounds for each of the multiple sets of music data. The original music data may comprise multiple channels of music data forming a three-dimensional sound image.

The electronic watermark sounds in the method may be synthesized into each bar of the music data. The electronic watermark sounds may be synthesized into each bar and beat of the music data. The electronic watermark sounds may be synthesized into a selected number of bars of the music data. The electronic watermark sounds may be synthesized into the entire music data.

The outputting in the method may comprise producing an encoded music file. The encoded music file may be sent over a network to a recipient. The encoded music file may be recorded on a recording medium. The encoded recording medium may comprise a compact disk or digital versatile disk.

In another embodiment of the invention, there is a system for synthesizing electronic watermarks, the system comprising a generation process configured to generate electronic watermark sounds for music data comprising a converting process configured to convert harmonic overtones that match the music data into signals, a synthesis process configured to synthesize the generated electronic watermark sounds into the music data, and an output process configured to output the synthesized electronic watermark sounds and the music data.

In another embodiment of the invention, there is a computer usable medium having computer readable program code embodied therein for synthesizing electronic watermarks, the computer readable code comprising instructions for generating electronic watermark sounds for music data comprising converting harmonic overtones that match the music data into signals, synthesizing the generated electronic watermark sounds into the music data, and outputting the synthesized electronic watermark sounds and the music data.

In another embodiment of the invention, there is a method of synthesizing electronic watermarks, the method comprising generating electronic watermark sounds for music data comprising converting harmonic overtones that match the music data into signals, synthesizing the generated electronic watermark sounds into the music data, wherein the auditory sound quality of the music data is not affected significantly, and outputting the synthesized electronic watermark sounds and the music data.

In yet another embodiment of the invention, there is a method of synthesizing electronic watermarks, the method comprising a) generating electronic watermark sounds for original music data comprising i) determining orders of harmonic overtones for the original music data, and ii) converting the determined orders of harmonic overtones into signals, b) synthesizing the generated electronic watermark sounds into the original music data, and c) outputting watermarked music data comprising the synthesized electronic watermark sounds and the original music data.

The method may additionally comprise entry of copyright information, and may further comprise entry of auxiliary data. The method may additionally comprise distributing the watermarked music data. Determining orders of harmonic overtones may be performed automatically based on the length of the original music data. Determining orders of harmonic overtones may be performed automatically based on a calculated sum of copyright information. Determining orders of harmonic overtones may be performed automatically based on a calculated sum of copyright information and auxiliary data.

DETAILED DESCRIPTION OF CERTAIN INVENTIVE EMBODIMENTS

The following description presents certain specific embodiments of the present invention. However, the present invention may be embodied in a multitude of different ways as defined and covered by the claims. In this description, reference is made to the drawings wherein like parts are designated with like numerals throughout.

The technology described in the Applicant's Japanese Publication 2001-343974 of Patent Application No. JP2000-160233, which is hereby incorporated by reference, produces no noise from the audible-frequency signals it uses. Further, it minimizes the deterioration of sound quality in the original music data and prevents the watermarks from being deleted through editing, compression, copying, conversion or other manipulation of the music data. Therefore it presents no problem as an electronic watermark technology for music data. However, since the method records electronic watermark sounds consisting of pedal tones or other consonances matching the tonality of the original music data by synthesizing the watermarks into the data, there is a limit in terms of the volume or amount of data that can be synthesized for the electronic watermark sounds.

Embodiments of the present invention were developed in light of the above situation and aim to provide a method of, and a system for, synthesizing electronic watermarks that can synthesize electronic watermark sounds of larger data volumes by minimizing the deterioration of sound quality in the original music data.

One embodiment of the invention includes a generation process for generating electronic watermark sounds for music data by converting into signals harmonic overtones that match the music data, and an output process for outputting the electronic watermark sounds generated in the generation process after synthesizing them into the music data. The artificial processing of harmonic overtones that indisputably exist in nature and the use of them as electronic watermarks allows for a synthesis of electronic watermark sounds of larger data volumes while minimizing the degradation of sound quality in the original music data. This is because when harmonic overtones up to the sixteenth order that are deemed sufficient under harmonic theory are considered, two harmonic overtones are needed to construct a digital data. Therefore, eight types of electronic watermarks can be simultaneously superimposed on a single sound of original music data.

The electronic watermark sounds may contain signals representing the copyright information of the music data. Embodiments are capable of preventing violations of music copyrights, such being the primary goal in the application of electronic watermarks to music data. Also, since a very large volume of data can be synthesized, the subject method can be used to control partial uses of music data, for example by synthesizing copyright information into a selected number of bars or all of the bars of the original music data.

The music data may include multiple sets of music data, including voice and/or instrumental sound, and the generation process may generate separate electronic watermark sounds for each of the multiple sets of music data. Embodiments are capable of synthesizing separate electronic watermark sounds into different parts, such as individual musical instruments, comprising music data. Therefore, it is possible to synthesize electronic watermark sounds of larger data volumes that contain not only text copyright information but also text and/or image information specifying messages from the copyright owner or advice on how to play the music, as well as program data for implementing copy protection and other functions, for example.

The music data may include multiple channels of music data forming a three-dimensional sound image. Embodiments are capable of synthesizing different electronic watermark sounds for each of the multiple channels of music data, which are in turn isolated from one another in distribution, output and other processes. Therefore, electronic watermark sounds for a given channel do not mix with those for other channels. This allows for the easy handling of electronic watermark sounds even when the volume of such data is large.

Another embodiment of the invention relates to the computer-based execution of a generation state for generating electronic watermark sounds for music data by converting into signals harmonic overtones that match the music data, and an output state for outputting the electronic watermark sounds generated in the generation state after synthesizing them into the music data. The artificial processing of harmonic overtones that indisputably exist in nature and use of them as electronic watermarks allows for a synthesis of electronic watermark sounds of larger data volumes while minimizing the degradation of sound quality in the original music data. This is because when harmonic overtones up to the sixteenth order that are deemed sufficient under harmonic theory are considered, two harmonic overtones are needed to construct a digital data. Therefore, eight types of electronic watermarks can be simultaneously superimposed on a single sound of original music data.

The unauthorized copying assumed by this method and system covers mass media such as television or Internet sites that play musical works only partially without paying royalties, or a third party other than the reproduction rights holder that sells illegal copies for profit. In fact, the unauthorized use of copyrighted works by the mass media is creating a serious problem among the authors and composers of musical works. However, it is difficult to follow up on every use of copyrighted music if the music is played only partially, and the authors/composers cannot currently do anything to address the situation. By incorporating electronic watermark data, however, it becomes possible to identify the source music even from a single phrase, bar or beat of music.

An example of at least one embodiment of the method and system is explained below, with reference to the drawings.

Figure 1:
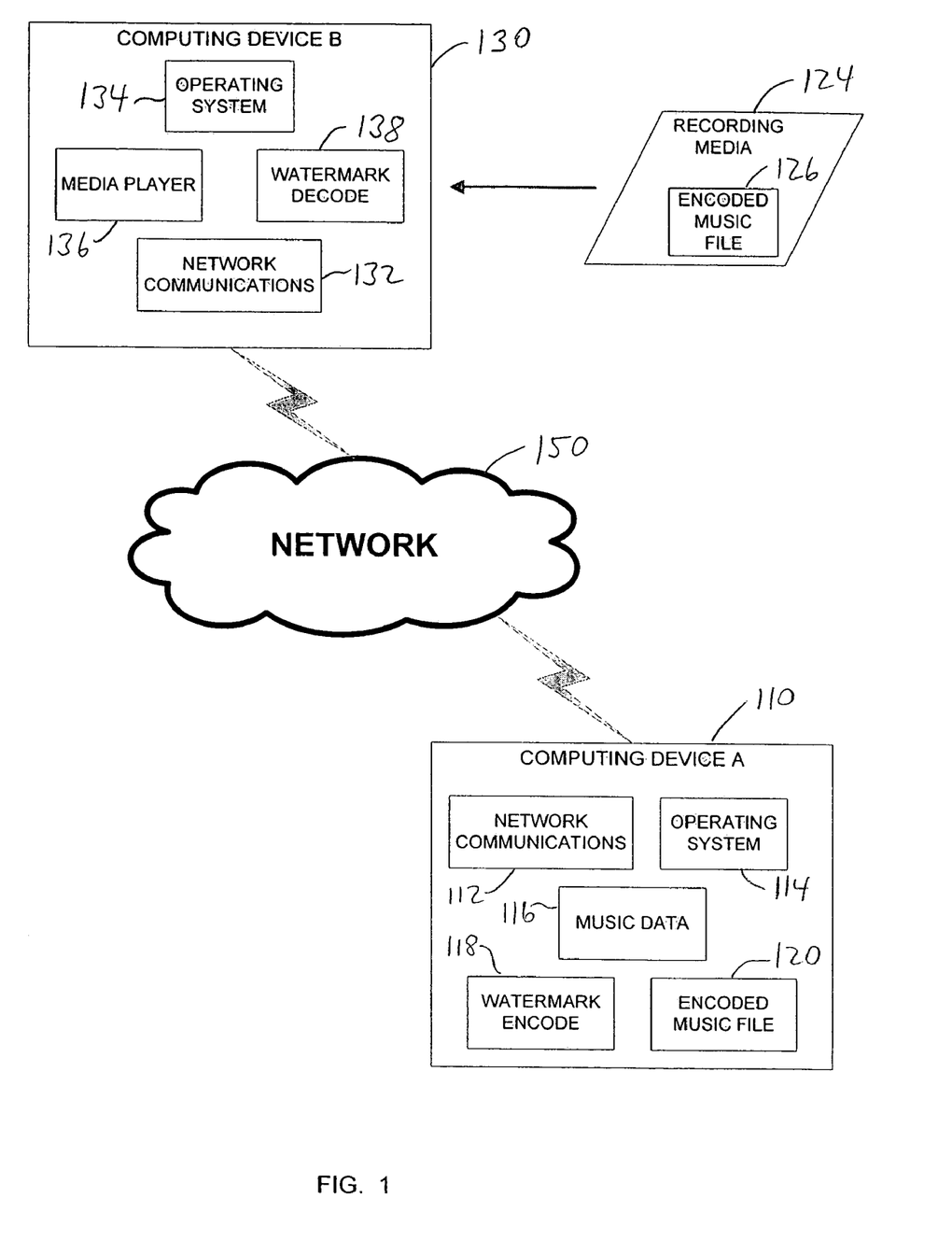
FIG. 1 is a block diagram of one embodiment of the system for synthesizing electronic watermarks.

Referring to FIG. 1, one embodiment of the system for synthesizing electronic watermarks will be described. A computing device (A) 110 is in communication with a computing device (B) 130 via a network 150. Each of the computing devices 110 and 130 can be a processor controlled device that executes program code and facilitates access to the network 150, including terminal devices, such as personal computers, workstations, servers, clients, minicomputers, mainframe computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, mobile telephones, portable music playback devices or a combination thereof. The computing devices may further possess one or more input devices such as a keyboard, mouse, touch pad, joystick, pen-input-pad, and the like. The computers may also possess an output device, such as a visual display and an audio output. One or more of these computing devices may form a computing environment. These computing devices may be uni-processor or multi-processor machines. Additionally, these computing devices may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data.

The network 150 can be any of many types of networks configured to send and receive files, such as encoded music files. The network 150 may include a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others. The network 150 may be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means. In addition, the connectivity to the network 150 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity.

One of the computing devices (device 110 for example) can be configured to generate an encoded music file 120. The computing device 110 includes a network communications module 112 for connection to the network 150. The network communications module 112 may include, in one embodiment, a network interface card, a modem, or other network connection device suitable for connecting to the network 150. The computing device 110 includes an operating system 114, such as the various types of Microsoft Windows, Apple OS X, Linux, Symbian OS, PalmOS, etc. The computing device 110 operates on music data 116 using a watermark encode program 118 to generate the encoded music file 120. The watermark encode program 118 will be described herein below. The encoded music file 120 can then be sent via the network communications module 112 over the network 150 to a recipient device, such as computing device 130.

The computing devices 110, 130 may contain program logic, or other substrate configuration representing data and instructions, which cause the computing device to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

Computing device 130 includes a network communications module 132 for connecting to the network 150 (as described above), an operating system 134 (as described above), a media player 136, and a watermark decode program 138. The media player 136 can be one of many available players such as are made available by RealNetworks, Microsoft, Apple, and others. The sent encoded music file 120 is received by the network communications module 132 and provided to the watermark decode program 138 for processing prior to being played by the media player 136. The watermark decode program 138 will be described herein below. Alternatively, a recording media 124 having an encoded music file 126 may be obtained, such as via a purchase, by a user of the computing device 130 and presented to the computing device 130 for playback via the watermark decode program 138 and the media player 136. The recording media 124 can be a CD, MD, CD-R, DVD, memory card, or other type of recording media.

Figure 2:
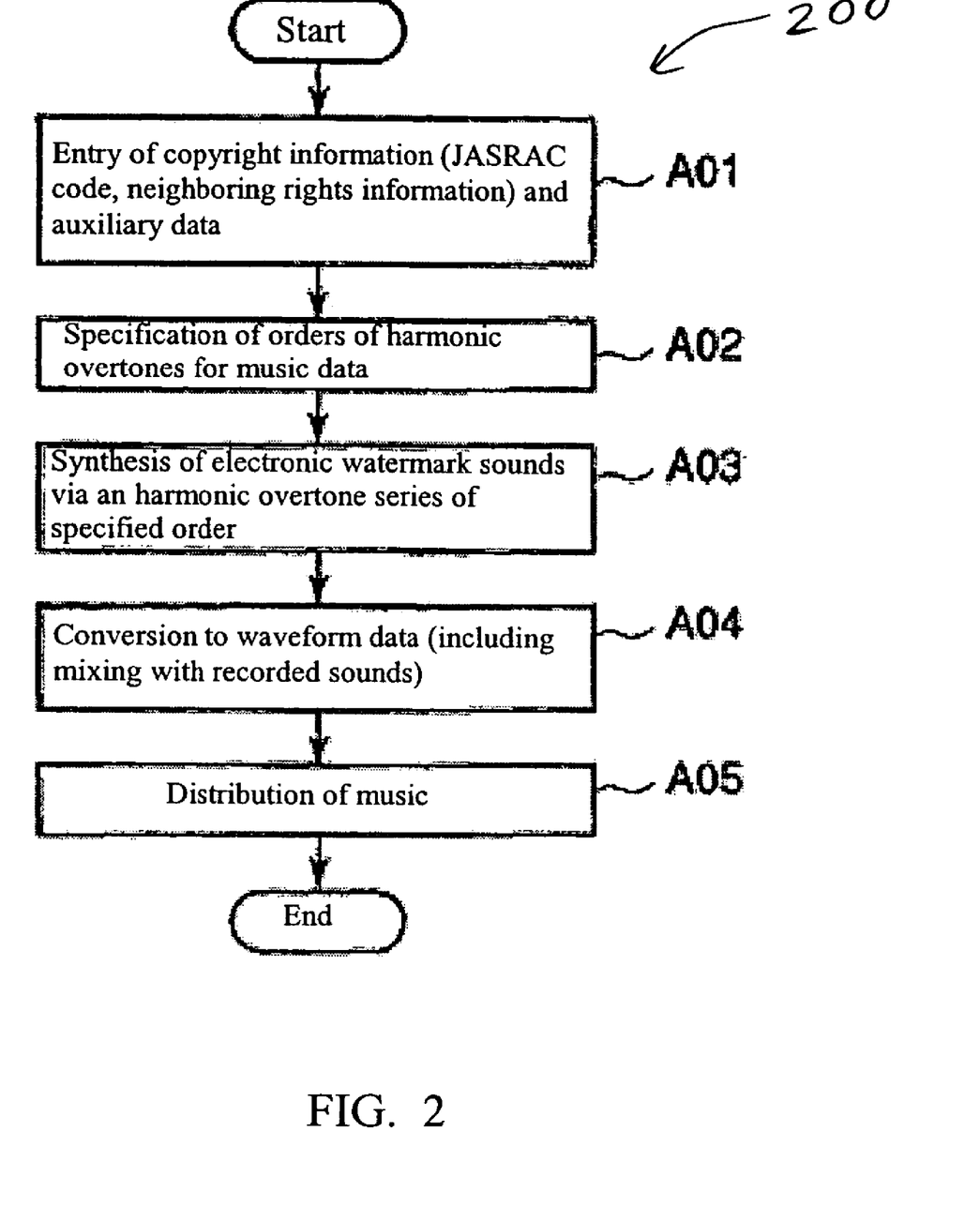
FIG. 2 is a flowchart showing a process of synthesizing an electronic watermark such as in the embodiment shown in FIG. 1.

FIG. 2 illustrates the processing states of a program 200, such as program 118 (FIG. 1), given as an application software for a device such as a personal computer, which synthesizes and distributes electronic watermarks for music data provided via MIDI (Musical Instrument Digital Interface) files, for example.

At the beginning of the process or program 200, the JASRAC (Japanese Society for Rights of Authors, Composers and Publishers) code, or similar code in other countries, is entered as the copyright information to be appended to the applicable music data, along with data relating to the neighboring rights as well as the date/time, information specifying the content to be distributed, and other auxiliary data at state A01. In one embodiment, practically an unlimited amount of data can be appended.

A JASRAC code is assigned to a given piece of music when the music is registered with the JASRAC, so that the lyricist, composer, copyright owner and registration date of a given music can be identified through its JASRAC code.

As for the information on the neighboring rights, the performer, record producer and other parties involved in the creation of the music data are entered. The auxiliary data can be entered as character-string data, image data, program data or any other arbitrary data.

Once the copyright information and auxiliary data have been entered at state A01, the orders of harmonic overtones constituting the electronic watermark sounds are entered at state A02.

Before proceeding to the next state, an explanation of harmonic overtones will be described in conjunction with FIG. 3.

Natural sounds have various tones, and these tones are made of harmonic overtones that are combined in accordance with a specific set of rules.

Figure 3A:
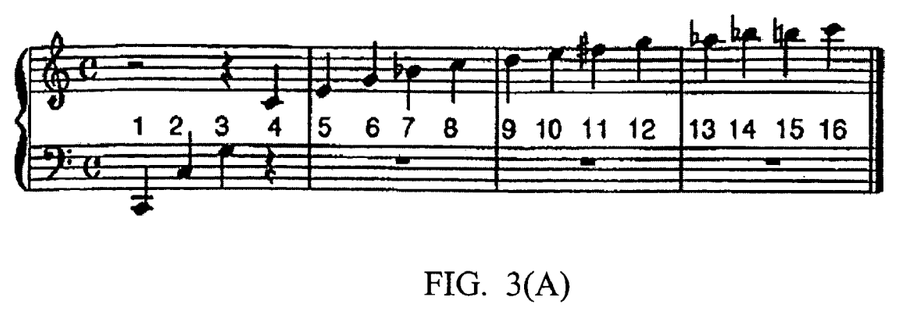
FIGS. 3(A) and 3(B) are diagrams showing a basic concept of harmonic overtones such as used in the embodiment shown in FIG. 1.

Harmonic overtones, often referred to as natural harmonic overtones, are the most important element in determining tones. The tone of a sound changes in accordance with the mixing ratio of underlying harmonic overtones; that is, how the fundamental tone, being the lowest note, is combined with a harmonic overtone having a specific interval relative to the fundamental tone. In the context of natural sounds, the intervalic relationships of harmonic overtones generated in the natural harmonic overtone series are shown in FIG. 3(A). The harmonic overtones include: the second-order harmonic overtone located an octave above the fundamental tone; the third-order harmonic overtone located an octave and a perfect fifth above the fundamental tone: the fourth-order harmonic overtone located two octaves above the fundamental tone; the fifth-order harmonic overtone located two octaves and a major third above the fundamental tone; the sixth-order harmonic overtone located two octaves and a perfect fifth above the fundamental tone; the seventh-order harmonic overtone located two octaves and a minor seventh above the fundamental tone; the eighth-order harmonic overtone located three octaves above the fundamental tone; the ninth-order harmonic overtone located three octaves and a major second above the fundamental tone; the tenth-order harmonic overtone located three octaves and a major third above the fundamental tone; the eleventh-order harmonic overtone located three octaves and an augmented fourth above the fundamental tone; the twelfth-order harmonic overtone located three octaves and a perfect fifth above the fundamental tone; the thirteenth-order harmonic overtone located three octaves and a minor sixth above the fundamental tone; the fourteenth-order harmonic overtone located three octaves and a minor seventh above the fundamental tone; the fifteenth-order harmonic overtone located three octaves and a major seventh above the fundamental tone; and the sixteenth-order harmonic overtone located four octaves above the fundamental tone. Other elements that determine the characteristics of sound include those relating to sound volume, such as rise and attenuation or decay.

Figure 3B:
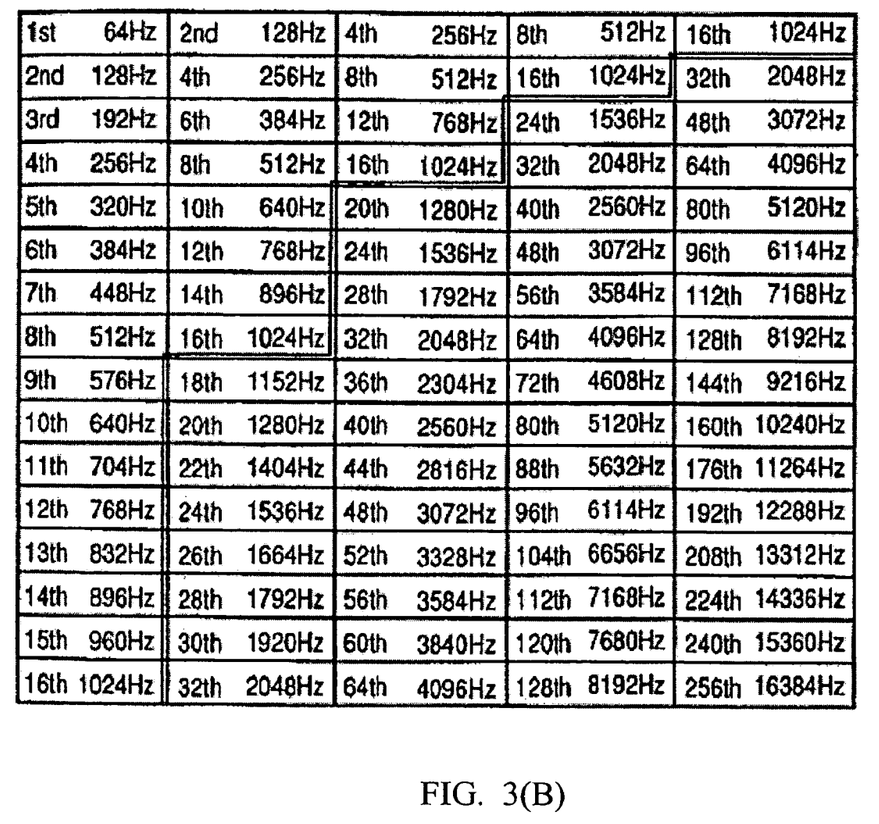

Theoretically speaking, harmonic overtones beyond the sixteenth order can be considered. However, harmonic overtones up to the sixteenth order are sufficient as far as musical sound is concerned, because harmonic overtones beyond the sixteenth order have long intervals from the fundamental tone and consequently very different frequencies than that of the fundamental tone. As a result these high-order harmonic overtones have lesser harmonic affinity with the fundamental tone, and their existence loses meaning from the musical standpoint. FIG. 3(B) provides a frequency table of the harmonic overtone series from the fundamental tone to the sixteenth-order harmonic overtone, where the fundamental tone is set to C and has a frequency of 64 Hz.

Specifying any two of the above sixteen types of harmonic overtones and converting them into signals makes it possible to employ harmonic overtones as digital data. Specifically, when one of a given pair of harmonic overtones is defined as "On" and the other is defined as "Off," these "On" and "Off" can be used as binary digits to comprise digital signals. This in turn makes it possible to incorporate into a tonal sound a data that serves as an electronic watermark. Additionally, the incorporated data can be extracted if the frequencies of the digitized harmonic overtones are known. Since there are sixteen available types of harmonic overtones (including the fundamental tone), it is theoretically possible to achieve a maximum of eight types of digital signals by combining any two of the sixteen types of harmonic overtones. However, the fundamental tone has a large significance as a musical tone, and it is clear that it is musically difficult to include the fundamental tone in a given signal. Moreover, in terms of frequencies the extraction of digital data becomes easier as the orders of harmonic overtones in a given pair become lower, but the amount of data becomes smaller. Conversely, combining harmonic overtones of higher orders increases the amount of data, but the extraction of such data becomes more difficult.

The orders of harmonic overtones specified at state A02 (FIG. 2) can be determined automatically, based on the length of original music data or the calculated sum of copyright information and other incorporated data input at state A01 (FIG. 2).

For example, if the music's JASRAC code (JASRAC stands for "Japanese Society for Rights of Authors, Composers and Publishers") is "067-8729-1," then the title of this music is "Haruichiban," for which "T-101.501.101-3" is already published as the ISWC (the International Standard Work Code, as defined by the CIS (Common Information System) Project promoted by the International Confederation of Societies of Authors and Composers, or CISAC). These codes already contain the music's title, author, rights holder, release date, etc. Therefore, in this state the eighth-order harmonic overtone and fifteenth-order harmonic overtone are specified so that, for example, the former is represented by "0" and the latter is represented by "1" in order to convert these codes to binary digits.

The overtones can be selected by a composer, for example, or can be selected automatically as described in a prior paragraph. The overtones can be selected by first determining overtones of a base tone. Then, the overtones that will least affect the original sound when synthesized with the original sound are selected. However, the determination as to which overtones will minimize any effects on the original sound will be based on each composer's personal preference, so in sum, a composer may select any two overtones he or she feels best suit the music.

At state A03 (FIG. 2), digital signals are generated from two or more previously selected harmonic overtones and are then synthesized with the original music data as sounds that function as an electronic watermark. State A03 generates electronic watermark sounds containing the data of each code specified above. By synthesizing electronic watermark sounds using the harmonic overtones predetermined in state A02, the extraction of data from the electronic watermarks becomes possible in a subsequent state.

Figure 4:
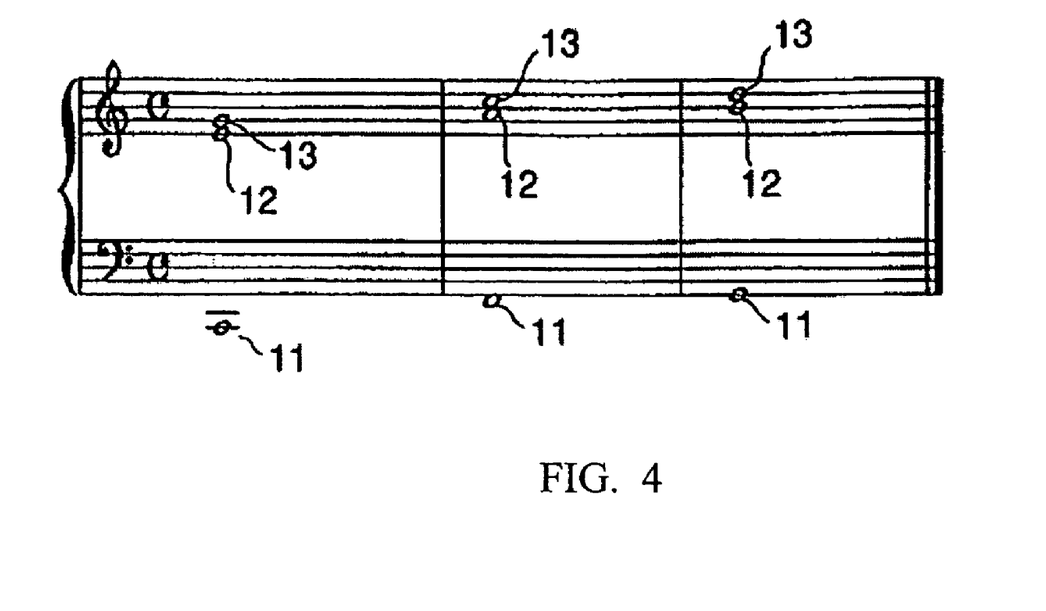
FIG. 4 is a diagram showing a relationship of original music data and harmonic overtones appended as an electronic watermark such as synthesized by the process shown in FIG. 2.

FIG. 4 provides a simple example of previously selected harmonic overtones when appending a set of digital signals to the original music data. The intervals of harmonic overtones change as the interval of the fundamental tone changes, but their order relative to the fundamental tone remains the same and their frequencies will change in parallel. These characteristics allow for the tracking of harmonic overtones converted into digital signals.

In FIG. 4, the selected fifth-order harmonic overtone and sixth-order harmonic overtone are described as whole notes for the purpose of explaining the intervals of harmonic overtones. In actuality, however, converting a selected pair of harmonic overtones into digital signals utilizes rhythms corresponding to the incorporated data to be appended to the respective overtones. Given an increase in the number of rhythms repeated over a specified time, the amount of data increases as well. For example, if the tempo is the same an eighth note is associated with more data than a fourth note, a sixteenth note is associated with more data than an eighth note, a thirty-second note is associated with more data than a sixteenth note, a sixty-fourth note is associated with more data than a thirty-second note, and a hundred and twenty-eighth note is associated with more data than a sixty-fourth note. Since the listener does not have to recognize these rhythms it is theoretically possible, in light of the practical utility of electronic watermarks, to divide the rhythms into as many pieces as possible within the limitations set by the frequencies of the selected harmonic overtones.

For example, if the JASRAC code is "182," the corresponding binary digits are "10110110." By assigning C with a frequency of 256 Hz for "1" and G with a frequency of 384 Hz for "0" at state A02 (FIG. 2), "CGCCGCCG" will be generated as a row of electronic watermark tones. It takes four seconds to generate these eight tones representing "182" using fourth notes at a tempo of 120. However, the use of thirty-second notes of the same tempo will reduce the generation time to 0.5 second. Sixty-fourth notes at a tempo of 240 will further shorten the generation time to 0.125 second, thereby allowing more data to be incorporated.

As explained above, the amount of data is increased by appending rhythms and a relatively larger amount of data can be incorporated as the selected harmonic overtones employ higher orders and frequencies. Along the same line of reasoning, it is also possible to define a set of multiple harmonic overtones arbitrarily selected from those up to the sixteenth order, and to create a more complex structure of harmonic overtones in order to further increase the amount of data. Naturally a more complex structure means that the extraction of incorporated data will present a higher degree of difficulty. However, incorporation of the data itself will encounter no obstacle other than the theoretical determination of the method of synthesis. It is therefore possible to incorporate data prior to the completion of an extraction system, or to synthesize into the original music data a set of more advanced rights information, image information and/or other information that will be extracted in the future. Extraction will, of course, be easier if the digital signals have a simple structure comprising around two to four harmonic overtones, which indicates that electronic watermarks consisting of harmonic overtones will be fully ready for commercialization in the very near future.

In one embodiment, once electronic watermark sounds have been synthesized into all of the original music data in state A03, the entire music data in MIDI file format is converted to waveform data in PCM or other file format at state A04.

In one embodiment, the file format to be used for the conversion of music data to waveform data can be freely selected from among WAVE, MP3 (MPEG audio layer 3, used in data compression for distribution), ATRAC3, and so forth.

Regarding the conversion to waveform data, instead of the MIDI-file music data created by electronic musical instruments, a recorded result mixed with sounds of other live musical instruments, voice, sound effects, etc., can also be used.

The process 200 in FIG. 2 is completed when the music data, synthesized with electronic watermark sounds and converted to waveform data, is distributed (state A05) via a recording media such as CD, MD, CD-R or memory card or a communication media such as the Internet.

Figure 5:
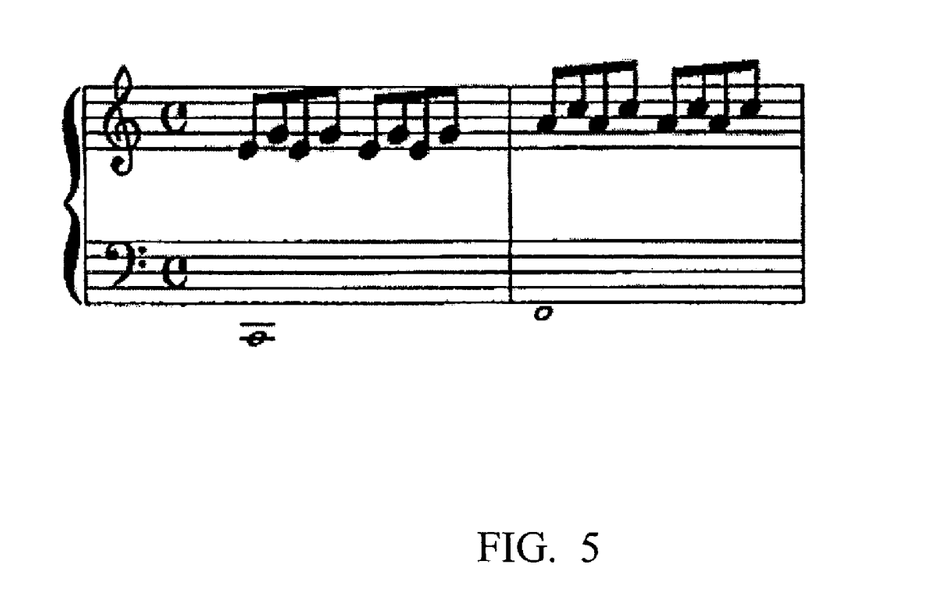
FIG. 5 is a diagram showing a relationship of original music data and a pattern of harmonic overtones appended as an electronic watermark such as synthesized by the process shown in FIG. 2.

As shown in FIG. 4 above, the intervals of the appended harmonic overtones change as the base interval of the original music data changes. This change in intervals may make the incorporation (encoding) and extraction (decoding) of data more difficult. To solve the problem a specific rhythm arrangement (key arrangement) may be determined for use in recognizing a selected harmonic overtone. By placing an appropriate key arrangement in the music data at each point of intervalic change, it becomes possible to specify and extract the harmonic overtones comprising the digital signals. Since these key arrangements can be determined arbitrarily, it is possible to create a system that protects the data thus incorporated by preventing it from being read by third parties who do not know the key arrangements. For example the system may provide a data header consisting of a pattern, such as one that when the original music data reaches a specified interval, it alternately repeats the fifth-order overtone and sixth-order overtone twice for two sets of notes, or a total of four times, as shown in FIG. 5, and then synthesizing after that data header, the electronic watermark sounds containing specific information.

The rhythm arrangement is different from the data header pattern. The data header pattern provides signal data that specifies the format of the rhythm arrangement and expressly indicates its presence. On the other hand, the rhythm arrangement represents specific information data generated in accordance with the format specified by the data header pattern.

Using the previous example of the rhythm arrangement above where the JASRAC code is "182", the data header pattern expressly indicates that this tone row consisting of Cs and Gs marks the start of the incorporated data. For example, if a rhythm pattern "CCCGGGCGCGGGCG" is predefined as the data header, "CCCGGGCGCGGGCGCGCCGCCG" indicates "182" and "CCCGGGCGCGGGCGCCGCCGGG" indicates "216." If "GCCCCGGGCGCGGGCGCCGCCGGG" is detected in the incorporated data-extraction process, the "GC" at the beginning will be ignored and the extraction starts upon detection of the subsequent "CCCGGGCGCGGGCG." Subsequently, the following "CCGCCGGG" will be recognized as an information part and detected as binary digits "11011000," which will be converted to decimal digits "216." Therefore, the source music can be identified even when the music is stopped in the middle, which makes this system a very effective means of preventing the unauthorized use of copyrighted music by the mass media.

Given the foregoing explanation, in one embodiment, the types of electronic watermarks that can be synthesized are limited to those that match the orders of harmonic overtones specified for the original music data. In reality, though, a single music data consists of multiple sets of music data such as voice and/or instrumental sounds, and therefore, at state A03, separate electronic watermark sounds may be synthesized for each of these multiple sets of music data.

Therefore, when separate electronic watermark sounds are to be synthesized into different parts, such as individual musical instruments, comprising music data, then it is possible to synthesize electronic watermark sounds of larger data volumes that contain not only text copyright information but also text and/or image information specifying messages from the copyright owner or advice on how to play the music given by the performer of each musical instrument, as well as program data for implementing copy protection and other functions. This may be used, for example, in the synthesis of electronic watermark sounds for original music data (sounds) that consist of the same sounds recorded simultaneously through two channels on the right and left or through multiple channels of another configuration.

Additionally, separate electronic watermark sounds may be synthesized for different audio channels in consideration of the fact that a single music data may consist not only of multiple parts of music data but also of stereo sounds taken from two channels each on the left and right or surround sounds taken from a total of five channels at the front, rear, right, left and center, for example. This may be used, for example, in the synthesis of electronic watermark sounds for music data recorded separately through two channels on the right and left or through multiple channels of another configuration.

Synthesizing different electronic watermark sounds for each of the multiple channels of music data, being isolated from one another in distribution, output and other processes, will facilitate the easy handling of electronic watermark sounds even when the volume of data is large, without causing the electronic watermark sounds for music data of a given channel to mix with those for the music data of other channels.

Next, the processing states are explained that determine whether or not the music data, as received in a recording media or transmitted via a network such as the Internet and which should have been distributed with synthesized electronic watermark sounds as explained above, has been distributed through the official route.

Figure 6:
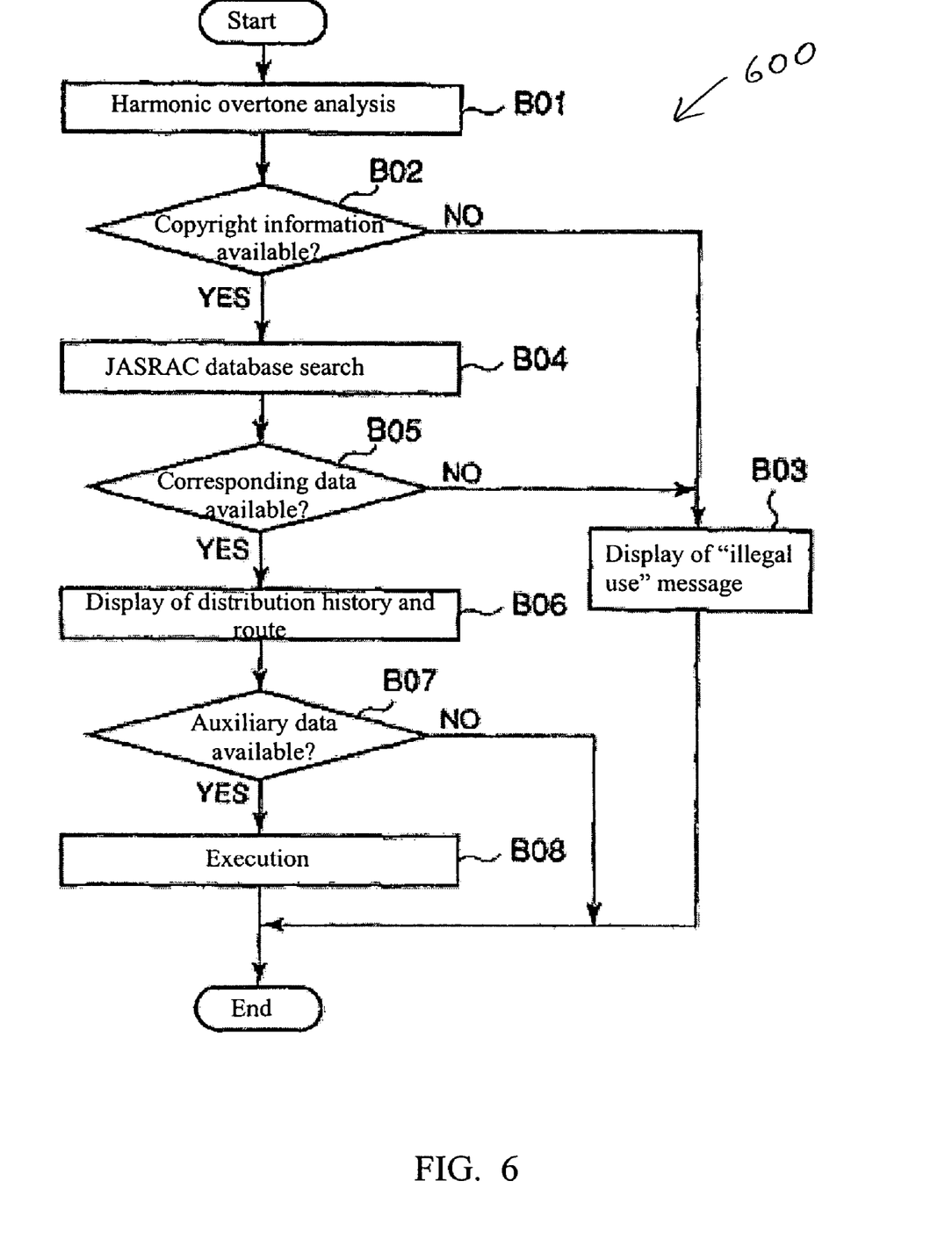
FIG. 6 is a flowchart showing an electronic watermark analyzing process that takes place when the music data is played such as in the embodiment shown in FIG. 1.

FIG. 6 illustrates the processing states of a program 600, such as program 138 (FIG. 1), given as an application software for a device such as a personal computer, which is executed when music data is played/output and then analyzes the electronic watermark sounds synthesized into the music data.

It is assumed that by connecting to the database linked to the public website of the JASRAC, or other entity for the corresponding country of use, via the Internet it is possible to obtain on the personal computer the copyright information and other data corresponding to all past distributions of music data approved by the JASRAC.

The first state B01 in this process or program 600 analyzes the waveforms of the given music data and extracts, if any, the harmonic overtones matching the tonalities of the music data that have been processed and synthesized as electronic watermark sounds, in order to determine whether or not harmonic overtones have been synthesized based on the above extraction results of electronic watermark sounds at a decision state B02.

State B01 in FIG. 6 represents the process of confirming the presence of electronic watermark sounds during the playback of music. The preset data header (described above) is checked, and if the data header is found, the subsequent data will be analyzed according to the method specified by the data header. The data header pattern can be set arbitrarily when electronic watermark sounds are incorporated, or it can be specified for each specific rights group or rights holder. Thus the data header serves as an important key for analyzing the incorporated data. In a way, the key arrangement functions like a primary PIN, the primary use of which is to specify the frequency of the sound to be used as the electronic watermark. Naturally, it is possible to position a secondary PIN following the data header's key arrangement. The secondary PIN can be used to strengthen the proof of certain data or it can function as a code used to read the data to those who know the existence of the secondary PIN.

If electronic watermark sounds cannot be extracted and the program 600 determines that no watermarks have been synthesized, then it is deemed that the applicable music data has been generated without permission from the copyright owner. Therefore, a message is displayed immediately to indicate that the music data is being used illegally at state B03, whereupon the process 600 will end.

If at decision state B02 the electronic watermark sounds can be extracted and the program 600 determines that watermarks have been synthesized, the program will then access the database linked to the public website of the JASRAC via the Internet and perform a search based on the harmonic overtones comprising the electronic watermark sounds at state B04, in order to determine whether or not the corresponding copyright information, etc. is available at a decision state B05.

If no corresponding copyright information is stored in the database or multiple sets of copyright information, etc., have been synthesized into the music data (which happens when a medley of music data is generated without permission from the respective copyright owners), a message is again displayed at state B03 to indicate that the music data is being used illegally, whereupon the process 600 will end.

State B05 in FIG. 6 determines the presence or absence of electronic watermark data. The premise here is that the applicable products (music CDs, etc.) already incorporate electronic watermark data. In this case products without electronic watermark data are considered to have been manipulated in some way in order to intentionally delete the electronic watermark data. Needless to say, this reasoning is valid if the distributors of such products are strictly prohibited from marketing products without electronic watermark data. If it is determined at state B05 that corresponding copyright information, etc., is stored in the database, the program 600 determines that the music data has basically not been generated illegally and displays the distribution history, distribution route and other information in accordance with the copyright information, etc. at state B06.

As explained above, by displaying the distribution history, distribution route and other information in accordance with the copyright information, and in consideration of the process through which the music data was received, it becomes possible to easily verify whether or not the music data has been obtained through the official route and whether or not royalties have been paid.

Following a display of the aforementioned information based on copyright information, the program 600 determines whether or not the electronic watermark sounds contain any auxiliary data other than the copyright information at state B07. If the program determines that auxiliary data does not exist, the process 600 will end. If auxiliary data is found, as determined at state B07, the applicable data file type is identified from the filename extension set in the auxiliary data file, and the auxiliary data file is executed at state B08.

In one embodiment, specifically, the program 600 determines that the auxiliary data is a text file or document file if the extension is ".txt," ".rtf," ".doc," ".csv," etc.; a (still) image file if the extension is ".jpg," ".gif," ".tif," etc.; a movie file if the extension is ".mpg," ".avi," ".mov," ".qt," etc.; a Web description file if the extension is ".htm," ".xml," etc.; or an application-program execution file if the extension is ".exe," etc. Subsequently it launches the application program needed to execute the identified file. Thus the music data into which the electronic watermark sounds have been synthesized is played, while at the same time actions corresponding to the content of the auxiliary data are executed. With the execution of such actions the process 600 depicted in FIG. 6 ends.

In the foregoing example the premise is that electronic watermark sounds containing copyright information and other auxiliary data have been synthesized into the original music data, and therefore the program 600 determines at the time the music data is played that at least copyright information has been synthesized and registered through an appropriate route and then proceeds to an execution of the auxiliary data. However, the present invention may be embodied in such a way that the auxiliary data will be executed immediately when the music is played, regardless of whether or not copyright information is available.

Without being limited to the above example, the present invention can be embodied in different variations as long as such variations do not deviate from the scope of the present invention.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of synthesizing electronic watermarks, the method comprising:

generating electronic watermark sounds for original music data comprising converting harmonic overtones that correspond to the original music data into signals;

synthesizing the generated electronic watermark sounds into the original music data; and outputting watermarked music data comprising the synthesized electronic watermark sounds and the original music data, wherein the synthesized electronic watermark sounds are within the humanly audible frequency range and not of the same frequency as the original music data, and wherein the synthesized electronic watermark sounds change tone as the original music data changes.

2. The method as defined in claim 1, wherein the electronic watermark sounds contain signals representing copyright information of the original music data.

3. The method as defined in claim 2, wherein the signals representing the copyright information are synthesized repeatedly and continuously throughout the music data.

4. The method as defined in claim 2, wherein the signals representing the copyright information are synthesized repeatedly and intermittently throughout the music data.

5. The method as defined in claim 1, wherein the original music data comprises multiple sets of music data, including voice and instrumental sound.

6. The method as defined in claim 5, wherein the generating comprises generating separate electronic watermark sounds for each of the multiple sets of music data.

7. The method as defined in claim 1, wherein the original music data comprises multiple channels of music data forming a three-dimensional sound image.

8. The method as defined in claim 1, wherein the electronic watermark sounds are synthesized into each bar of the music data.

9. The method as defined in claim 1, wherein the electronic watermark sounds are synthesized into each bar and beat of the music data.

10. The method as defined in claim 1, wherein the electronic watermark sounds are synthesized into a selected number of bars of the music data.

11. The method as defined in claim 1, wherein the electronic watermark sounds arc synthesized into the entire music data.

12. The method as defined in claim 1, wherein the outputting comprises producing an encoded music file.

13. The method as defined in claim 12, wherein the encoded music file is sent over a network to a recipient.

14. The method as defined in claim 12, wherein the encoded music file is recorded on a recording medium.

15. The method as defined in claim 14, wherein the encoded recording medium comprises a compact disk or digital versatile disk.

16. A system for synthesizing electronic watermarks, the system comprising:

a generation process configured to generate electronic watermark sounds for music data comprising a converting process configured to convert harmonic overtones that correspond to the music data into signals;

a synthesis process configured to synthesize the generated electronic watermark sounds into the music data; and an output process configured to output the synthesized electronic watermark sounds and the music data, wherein the synthesized electronic watermark sounds are within the humanly audible frequency range and not of the same frequency as the original music data, and wherein the synthesized electronic watermark sounds change tone as the original music data changes.

17. A computer usable medium having computer readable program code embodied therein for synthesizing electronic watermarks, the computer readable code comprising instructions for:
generating electronic watermark sounds for music data comprising converting harmonic overtones that correspond to the music data into signals;
synthesizing the generated electronic watermark sounds into the music data; and
outputting the synthesized electronic watermark sounds and the music data, wherein the synthesized electronic watermark sounds are within the humanly audible frequency range and not of the same frequency as the original music data, and wherein the synthesized electronic watermark sounds change tone as the original music data changes.

18. A method of synthesizing electronic watermarks, the method comprising:
generating electronic watermark sounds for music data comprising converting harmonic overtones that correspond to the music data into signals;
synthesizing the generated electronic watermark sounds into the music data, wherein the auditory sound quality of the music data is not affected significantly; and
outputting the synthesized electronic watermark sounds and the music data wherein the synthesized electronic watermark sounds are within the humanly audible frequency range and not of the same frequency as the original music data, and wherein the electronic watermark sounds change tone as the original music data changes.

19. A method of synthesizing electronic watermarks, the method comprising:

a) generating electronic watermark sounds for original music data comprising
  i) determining orders of harmonic overtones for the original music data, and
  ii) converting the determined orders of harmonic overtones into signals;
b) synthesizing the generated electronic watermark sounds into the original music data; and
c) outputting watermarked music data comprising the synthesized electronic watermark sounds and the original music data, wherein the synthesized electronic watermark sounds are within the humanly audible frequency range and not of the same frequency as the original music data, and wherein the electronic watermark sounds change tone as the original music data changes.

20. The method of claim 19, additionally comprising entry of copyright information.

21. The method of claim 20, additionally comprising entry of auxiliary data.

22. The method of claim 20, wherein determining orders of harmonic overtones is performed automatically based on a calculated sum of copyright information.

23. The method of claim 21, wherein determining orders of harmonic overtones is performed automatically based on a calculated sum of copyright information and auxiliary data.

24. The method of claim 19, additionally comprising distributing the watermarked music data.

25. The method of claim 19, wherein determining orders of harmonic overtones is performed automatically based on the length of the original music data.

* * * * *

UNITED STATES PATENT AND TRADEMARK OFFICE
CERTIFICATE OF CORRECTION

| | | |
|---|---|---|
| PATENT NO. | : 7,304,227 B2 | Page 1 of 1 |
| APPLICATION NO. | : 10/934752 | |
| DATED | : December 4, 2007 | |
| INVENTOR(S) | : Yusuke Hoguchi | |

It is certified that error appears in the above-identified patent and that said Letters Patent is hereby corrected as shown below:

In Column 14, line 42, in Claim 11, delete "arc" and insert -- are --, therefor.

Signed and Sealed this

Nineteenth Day of May, 2009

JOHN DOLL
*Acting Director of the United States Patent and Trademark Office*